(12) United States Patent
Feldstein et al.

(10) Patent No.: US 9,874,942 B2
(45) Date of Patent: *Jan. 23, 2018

(54) CONTROL SYSTEM FOR AUGMENTING A PORTABLE TOUCH SCREEN DEVICE

(71) Applicant: Crestron Electronics, Inc., Rockleigh, NJ (US)

(72) Inventors: George Feldstein, Creskill, NJ (US); Mark Labosco, New City, NY (US); Brian Fagan, Lake Hiawatha, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,302

(22) Filed: Apr. 6, 2015

(65) Prior Publication Data

US 2015/0212587 A1     Jul. 30, 2015

Related U.S. Application Data

(63) Continuation of application No. 12/960,791, filed on Dec. 6, 2010, now Pat. No. 9,024,866.

(Continued)

(51) Int. Cl.
*G06F 1/16* (2006.01)
*G06F 3/02* (2006.01)
(Continued)

(52) U.S. Cl.
CPC ............ *G06F 3/021* (2013.01); *G06F 1/1607* (2013.01); *G06F 1/1632* (2013.01); *G06F 1/1643* (2013.01); *G06F 1/1656* (2013.01); *G06F 1/1662* (2013.01); *G06F 1/1671* (2013.01); *G06F 3/023* (2013.01); *G06F 3/0227* (2013.01); *G06F 3/041* (2013.01); *G06F 3/0416* (2013.01);
(Continued)

(58) Field of Classification Search
CPC .................. G06F 1/1632; H04M 1/72575
USPC .............. 178/18.01–19.07; 340/7.22, 13.22; 345/156–178; 361/679.01–679.61
See application file for complete search history.

(56) References Cited

U.S. PATENT DOCUMENTS 6,853,293 B2 * 2/2005 Swartz ................... G06F 1/163
                                                        340/5.92
2009/0174998 A1 * 7/2009 Struthers ................ H04H 20/63
                                                        361/679.41

(Continued)

*Primary Examiner* — Michael Pervan
(74) *Attorney, Agent, or Firm* — Crestron Electronics, Inc

(57) ABSTRACT

Presented is a control system for augmenting a portable touch screen device having integral processing capability. The control system includes an enclosure configured for encasing the portable touch screen device, an internal docking connector configured for communicatively mating with the portable touch screen device, and hard buttons. At least one of the hard buttons is functionally configured for use with an application program running on the portable touch screen device. The control system includes further includes a processor configured for converting button actuations into a digital format, and a first facility for communicating the digital format to the portable touch screen device via the internal docking connector. The application program is configured such that, during operation, the application program communicates the status of the one hard button to at least one external device.

33 Claims, 10 Drawing Sheets

Related U.S. Application Data

(60) Provisional application No. 61/382,677, filed on Sep. 14, 2010.

(51) Int. Cl.
  *G06F 3/041* (2006.01)
  *G08C 17/02* (2006.01)
  *G06F 3/023* (2006.01)
  *G08C 19/00* (2006.01)
  *H04L 12/10* (2006.01)

(52) U.S. Cl.
  CPC ............ *G08C 17/02* (2013.01); *G08C 19/00* (2013.01); *H04L 12/10* (2013.01); *G08C 2201/10* (2013.01); *G08C 2201/30* (2013.01); *G08C 2201/92* (2013.01)

(56) References Cited

U.S. PATENT DOCUMENTS

| | | | | |
|---|---|---|---|---|
| 2010/0172081 A1* | 7/2010 | Tian | ................... | G06F 1/1632 361/679.29 |
| 2011/0167181 A1* | 7/2011 | Minoo | ................... | G06F 1/266 710/73 |
| 2011/0216495 A1* | 9/2011 | Marx | ................... | H05K 5/02 361/679.22 |

* cited by examiner

CONTROL SYSTEM FOR AUGMENTING A PORTABLE TOUCH SCREEN DEVICE

BACKGROUND OF THE INVENTION

Technical Field

The present invention relates generally to hand-held electronic touch screen devices such as smart phones, electronic book readers, and tablet personal computers, and more particularly to augmenting these devices with various external manual hard buttons and/or actuators and indicators for controlling remote devices.

Background Art

Touch screen smart phones, electronic book (eBook) readers, and tablet computers have become ubiquitous. Many such touch screen devices employ a touch screen interface along with generic manual controls and/or actuators, while other touch screen devices employ a touch screen interface alone.

The generic manual controls employed on a touch screen device are typically configured to operate of the touch screen device itself or configured to operate specific applications executing on the touch screen device, and are unavailable for controlling remote devices.

Although some touch screen interfaces are relatively sophisticated and incorporate advanced touch screen features such a multi-touch and gesturing features, touch screen interfaces are simply not appropriate for all applications. For example, existing touch screen devices do not provide dedicated volume control buttons that can be used to control the volume of remote devices.

While such dedicated buttons for controlling remote devices could be provided in the form of soft buttons via a graphical user interface on the touch screen device, such soft buttons would occupy a significant amount of on-screen area, and thus reduce the on-screen area available for other applications.

Further, using a touch screen interface for repetitive remote control functions, such as changing channels (i.e., channel surfing), for example, is awkward and uncomfortable, provides significant stress to a user's fingers, and can cause repetitive stress injuries (RSI). Despite these drawbacks, because of the graphic flexibility of the touch screen interface, remote controls are increasingly being equipped solely with touch screens.

Additionally, although users typically desire a remote control with a large display, the size of the touch screen is limited because the user needs to be able to hold the remote with one hand and input commands with the other, free hand. Remote controls with large touch screens, such as with tablet remote controls, are difficult to hold with one hand while inputting commands with the other hand. Typically, these large devices must be placed on a table or other surface to be operated properly. Users have a natural inclination to grasp tablet devices with each hand in an open precision grip, with the user's thumb finger above the top side of the tablet and the remaining four digit fingers on the bottom side supporting the tablet.

In view of the above-described issues, there is a need to integrate a relatively low-cost portable smart touch screen device with a specialized control device employing hard buttons to produce a remote control with the graphic flexibility of a touch screen interface and the ergonomic benefits of physical control buttons, and which may be easily operated while being held naturally by a user.

Additionally, there is a need for such a specialized control device to include a dedicated power supply and independent wireless networking capability in order to avoid usage limitations based on the limitations of the associated touch screen device.

SUMMARY OF THE INVENTION

It is to be understood that both the general and detailed descriptions that follow are exemplary and explanatory only and are not restrictive of the invention.

DISCLOSURE OF INVENTION

According to one aspect, the invention involves a control system for a portable touch screen device having integral processing capability. The control system includes an enclosure configured for encasing the portable touch screen device, an internal docking connector configured for communicatively mating with the portable touch screen device, and a plurality of hard buttons. At least one of the hard buttons is functionally configured for use with an application program running on the portable touch screen device. The system further includes a processor configured for converting button actuations into a digital format, and a first facility for communicating the digital format to the portable touch screen device via the internal docking connector. The application program is configured such that, during operation, the application program communicates a status of the at least one hard button to at least one external device.

In one embodiment, the control system further includes an IR emitter, and a second facility for communicating the digital format to the IR emitter. The IR emitter is configured to transmit IR control commands directly to the at least one external device.

In another embodiment, the enclosure further includes a front clam shell portion, and a rear clam shell portion.

In still another embodiment, the control system further includes an external USB connector.

In yet another embodiment, the control system further includes a USB switch, a first USB wired connection between the processor and the USB switch, a second USB wired connection between the internal docking connector and the USB switch, and a third USB wired connection between the USB switch and the external USB connector.

In another embodiment, the control system further includes an audio connector which mates directly to the portable touch screen device.

In still another embodiment, the control system further includes an authentication coprocessor.

In yet another embodiment, the application program is configured for controlling home and office equipment, the application program provides a user with status indications related to the home and office equipment, and hard button actuations are communicated wirelessly from the portable touch screen device in order to control the home and office equipment.

In another embodiment, the hard buttons are operable to adjust audio volume and lighting brightness without navigating through subpages of the application program.

In still another embodiment, the enclosure further includes a wired digital interface between the processor and the portable touch screen device, and the wired digital interface device is selected from the group consisting of: CAN bus, Ethernet, IEEE-1394 (Firewire), RS-232, RS-422, RS-485, and USB.

In yet another embodiment, the enclosure further includes a wireless digital interface In another embodiment, the wireless digital interface is selected from the group consisting of: IEEE-802.11 (Wi-Fi), IEEE-802.15.1 (Bluetooth), IEEE-802.15.4 (Zigbee), and infiNET™.

In still another embodiment, the wireless digital interface includes a proprietary protocol in the UHF frequency band.

In yet another embodiment, the wireless digital interface functions as a communication channel between the processor and the portable touch screen device.

In another embodiment, the wireless digital interface functions as a communication channel between the processor and an external device.

In still another embodiment, the enclosure further includes an infrared digital interface In yet another embodiment, the control system further includes the infrared digital interface is selected from the group consisting of: IrDA and RC-5 infrared protocol.

In another embodiment, the infrared digital interface communicates using a proprietary protocol.

In still another embodiment, the infrared digital interface functions as a communication channel between the processor and the portable touch screen device.

In yet another embodiment, the infrared digital interface functions as a communication channel between the processor and an external device.

In another embodiment, the control system further includes an Ethernet interface.

In still another embodiment, the control system further includes a power-over-Ethernet interface, and a power supply deriving electrical power from the POE interface and providing electrical power to the portable touch screen device.

In yet another embodiment, the hard buttons further include an OSD navigation pad, volume up/down, and dedicated function buttons to control "mute", "lights", "home", "guide", "info", and "exit".

In another embodiment, the enclosure further includes an external docking connector configured for communicatively mating with a mounting stand.

In still another embodiment, the mounting stand is configured for supporting the enclosure in space, is connected to an external power source, and is further configured for providing electrical power to the portable touch screen device.

According to another aspect, the invention involves a control system for a portable touch screen device having integral processing capability. The control system includes an enclosure configured for encasing the portable touch screen device, and a plurality of hard buttons. At least one of the hard buttons is functionally configured for controlling home or office equipment. The system further includes a wireless digital interface.

According to still another aspect, the invention involves a control system for a portable touch screen device. The control system includes an enclosure configured for encasing the portable touch screen device, one or more hard buttons disposed on the enclosure, and a communication path between the control system and the portable touch screen device. The communication path is configured for communicating control information.

In one embodiment, the communication path communicates signals corresponding to actuations of the hard buttons to the portable touch screen device.

In another embodiment, the control information includes control commands to be transmitted by the portable touch screen device to an external component.

In still another embodiment, the communication path communicates status information corresponding to an external device from the portable touch screen device to the control system.

In yet another embodiment, the communication path further includes an internal docking connector configured for mating with the portable touch screen device and a wired digital interface selected from the group consisting of CAN bus, Ethernet, IEEE-1394 (Firewire), RS-232, RS-422, RS-485, and USB.

In another embodiment, the communication path communicates control information from the portable touch screen device to the control system, and the system is further configured for transmitting the control information to an external device.

In still another embodiment, the communication path communicates status information corresponding to an external device from the control system to the portable touch screen device.

In yet another embodiment, the system further includes a wireless digital interface selected from the group consisting of: IEEE-802.11 (Wi-Fi), IEEE-802.15.1 (Bluetooth), IEEE-802.15.4 (Zigbee), infiNET™, and a proprietary protocol in the UHF band.

In another embodiment, the control system further includes a wireless digital interface that functions as a communication channel between the control system and an external device.

In still another embodiment, the system further includes a wireless digital interface that functions as a communication channel between the control system and the portable touch screen device.

In yet another embodiment, the system further includes an infrared digital interface selected from the group consisting of: IrDA, RC-5 protocol, and a proprietary protocol.

In another embodiment, the system further includes an infrared digital interface that functions as a communication channel between the control system and the portable touch screen device.

In still another embodiment, the system further includes an infrared digital interface that functions as a communication channel between the control system and an external device.

In another embodiment, the control system further includes an Ethernet interface.

In yet another embodiment, the control system further includes a power-over-Ethernet (POE) interface, and a power supply deriving electrical power from the POE interface and providing electrical power to the portable touch screen device.

In another embodiment, the power-over-Ethernet interface functions as a communication channel between the control system and an external device.

In still another embodiment, the control system transmits control information to an external device via the power-over-Ethernet interface.

In yet another embodiment, the control system receives feedback information from an external device via the power-over-Ethernet interface.

In another embodiment, at least one of the buttons is configured to remain functional regardless of the operational status of the portable touch screen device.

In still another embodiment, at least one of the hard buttons is configured for use with an application program running on the portable touch screen device, and at least one other hard button is configured to remain functional independent of the operational status of the application program.

In yet another embodiment, the control system further includes a mounting stand for supporting the enclosure.

In still another embodiment, the mounting stand includes an Ethernet interface.

In another embodiment, the mounting stand further includes a power-over-Ethernet interface and a detachable wired connection between the mounting stand and the enclosure.

In still another embodiment, the enclosure includes a front cover sizably adapted to protectively fit together along mating edges around the portable touch screen device; and the front cover includes an access opening providing viewing access to a display screen of the portable touch screen device.

In yet another embodiment, the control system further includes a battery and a charging circuit. The battery and charging circuit are configured to supply supplemental power to the portable touch screen device.

According to yet another aspect, the invention involves a control system for a portable touch screen device having integral processing capability. The control system includes an enclosure configured for encasing a portable touch screen device, the enclosure including a first portion and second portion, an internal docking connector configured for communicatively mating with the portable touch screen device, at least one hard button functionally configured for use with an application program running on the portable touch screen device, a processor for configured for converting hard button actuations into a digital format, a USB wired connection between the processor and the internal docking connector, and an Ethernet interface.

In one embodiment, the application program provides a user with control functions related home and office equipment, and status indications related to the home and office equipment.

In another embodiment, the control system further includes a mounting stand configured for supporting and connectively mating with the enclosure. The mounting stand is further configured for communicating information received from the control system to an external device as Cresnet control signals.

In still another embodiment, the control system further includes a mounting stand configured for supporting and connectively mating with the enclosure. The mounting stand is further configured for communicating streaming media received from an external device to the portable touch screen device.

In yet another embodiment, the Ethernet interface includes a power-over-Ethernet interface.

BRIEF DESCRIPTION OF DRAWINGS

The accompanying figures further illustrate the present invention. Exemplary embodiments are illustrated in reference figures of the drawings. It is intended that the embodiments and figures disclosed herein are to be considered to illustrative rather than limiting.

The components in the drawings are not necessarily drawn to scale, emphasis instead being placed upon clearly illustrating the principles of the present invention. In the drawings, like reference numerals designate corresponding parts throughout the several views.

LIST OF REFERENCE NUMBERS FOR THE MAJOR ELEMENTS IN THE DRAWING

Figure 1:
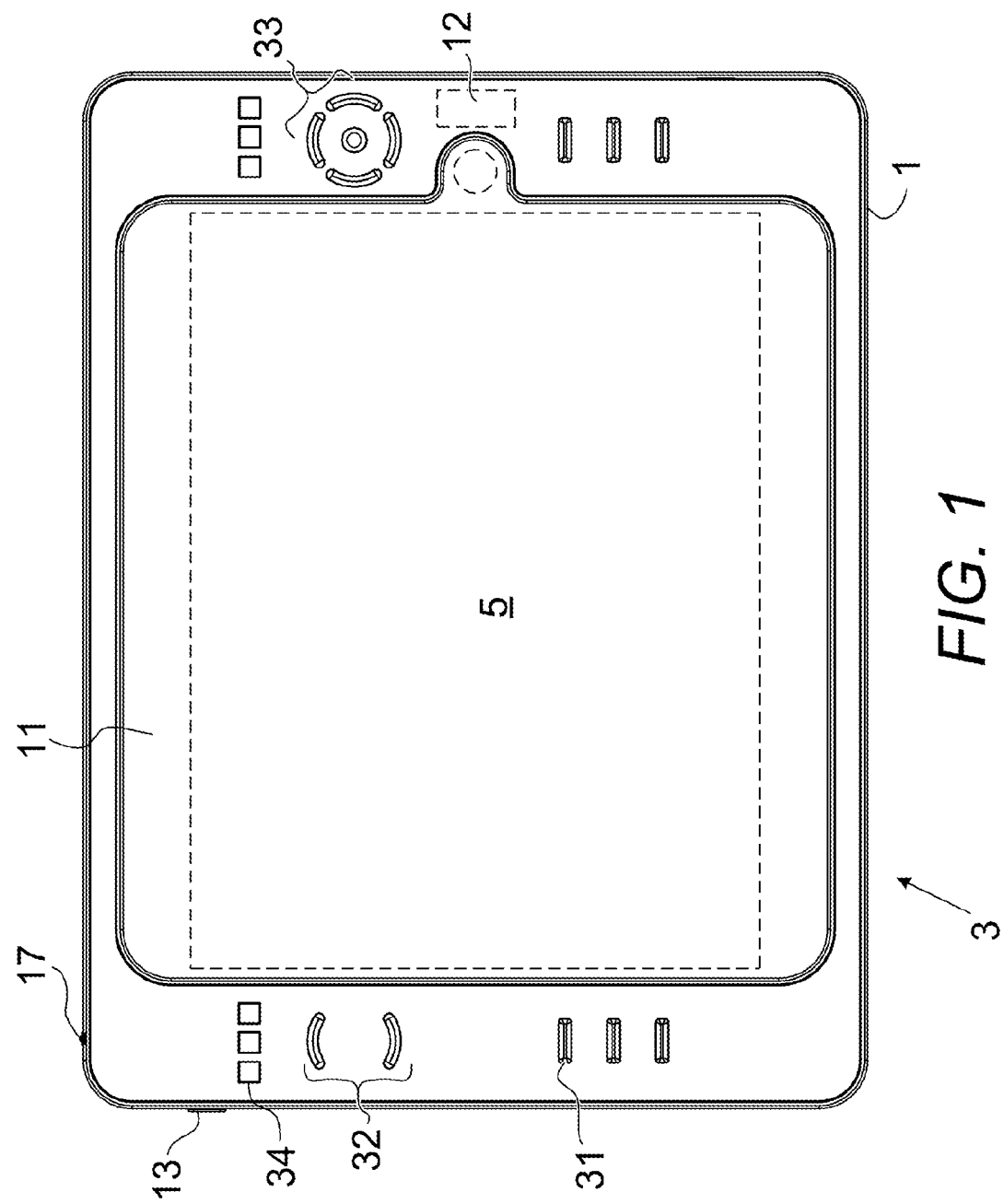
FIG. 1 is an illustrative front view of a portable touch screen device disposed within a clam shell enclosure that includes dedicated hard buttons, according to one embodiment of the invention.

The following is a list of the major elements in the drawings in numerical order.

1 enclosure (enclosing portable touch screen device 5)
 1' circular enclosure (enclosing portable touch screen device 5)
 2 charging docking station
 5 portable touch screen device
 10 front clam shell portion (of enclosure 1)
 12 internal docking connector (mates with portable touch screen device 5)
 13 external USB connector (mounted on front shell portion 10)
 14 audio connector (mates directly to portable touch screen device 5)
 17 IR emitter (to transmit commands to external devices)
 18 external power connector
 20 rear clam shell portion (of enclosure 1)
 21 external docking connector (mates with charging docking station 2)
 21' external docking connector (mates with charging docking station 2)
 21" external docking connector (mates with charging docking station 2)
 22 external docking connector (mates with charging docking station 2)
 31 hard button
 31' hard button
 31 2-quadrant button (hard buttons)
 32' 2-quadrant button (hard buttons)
 33 5-way thumb pad (hard buttons)
 33' 5-way thumb pad (hard buttons)
 34 indicator lights
 41 authentication coprocessor
 42 USB switch 43 memory
44 POE interface
45 power supply
46 power supply (from POE)
47 power supply
50 processor
51 processor
52 processor
53 processor
54 processor
55 processor
63 Zigbee antenna
64 Zigbee interface
65 power supply (power from portable touch screen device 5)
66 Wi-Fi interface
67 infrared (IR) interface
68 Wi-Fi antenna
70 home automation system
71 lighting equipment
72 HVAC equipment
73 security equipment
75 keypad
76 wireless Wi-Fi gateway
76' wireless Zigbee gateway
77 home theater
78 home audio
100 Internet
105 personal computer
131 first USB wired connection (to/from processor 50, 51, 52, 53)
132 second USB wired connection (to/from USB connector 13)
133 third USB wired connection (to/from internal docking connector 12)
134 fourth USB wired connection
431 fast Ethernet channel wired connection (to/from microprocessor)
731 wired digital interface (between portable touch screen device 5 and processor 53)

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

MODE(S) FOR CARRYING OUT THE INVENTION

The present invention involves augmenting a portable smart touch panel with an external control system by disposing the portable smart touch panel device, such as an Apple® iPad™ tablet computer, an Apple® IPhone®, or a Motorola® DROID® phone, or the like, for example, within a protective enclosure (e.g., clam shell) that includes one or more dedicated hard buttons and one or more means for wireless communication, and thereby forming a remote control device.

The remote control device accepts user input and is capable of transmitting control commands to a plurality of controllable devices, such as audio and video components, lighting controls, and HVAC controls. In one embodiment, the remote control device transmits control commands independent of whether or not the touch panel device is on, or a particular application is executing on the touch panel device. In another embodiment, the smart touch panel device executes an application that complements the intended end-use of the remote control, such as a graphic user interface that functions as a control panel for an office or home automation system or home theater.

The remote control, in various embodiments, utilizes communication methods known in the art to transmit control commands (e.g., key/button presses) either directly to the controllable devices or indirectly through an intermediate device. For example, the remote control may transmit control commands as infrared (IR) or wireless radio frequency (RF) signals.

Referring to FIG. 1, in one embodiment, an illustrative front view of a portable touch screen device 5 disposed within a protective clam shell enclosure 1 and thus forming a remote control device 3 is shown. The clam shell enclosure 1 includes a front clam shell portion 10 and a rear clam shell portion 20 (see FIG. 3). The front portion 10 of the enclosure 1 includes a viewing screen access opening 11 which is dimensioned and arranged to fit around the viewing screen of the touch screen device 5 so that the touch screen can be seen while disposed in the enclosure 1. The front portion 10 further includes dedicated hard buttons 31, 32, a five-way thumb pad 33, indicator lights 34, an external universal serial bus (USB) connector 13, and an infrared (IR) emitter 17. In other embodiments, more or less hard buttons, lights, and communication ports can be included. In addition to the dedicated hard buttons 31, 32, in various embodiments, the enclosure 1 includes one or more optical finger navigation buttons and/or trackballs.

Figure 2:
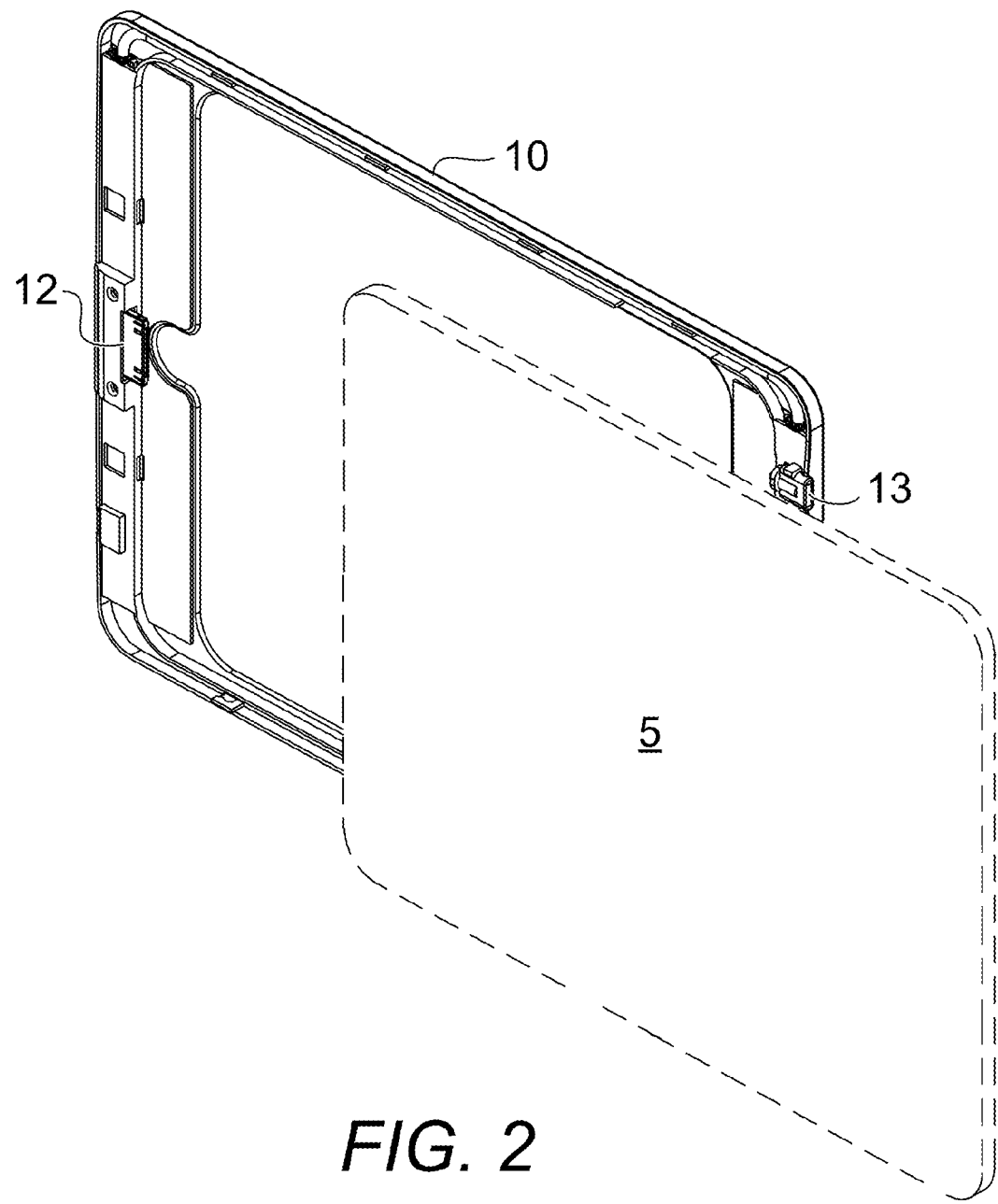
FIG. 2 is an illustrative perspective rear view of the portable touch screen device and the inside of the front portion of the clam shell enclosure of FIG. 1.

Referring to FIG. 2, an illustrative perspective rear view of the portable touch screen device 5 and the inside of the front portion 10 of the clam shell enclosure 1 are shown An internal docking connector 12 is disposed on the inside surface of the front portion 10. The docking connector 12 is configured for electrically connecting/mating to a connector (not shown) disposed on the portable smart touch screen device 5 and enables a communication and power transfer path between the enclosure 1 and the touch screen device 5.

Figure 3:
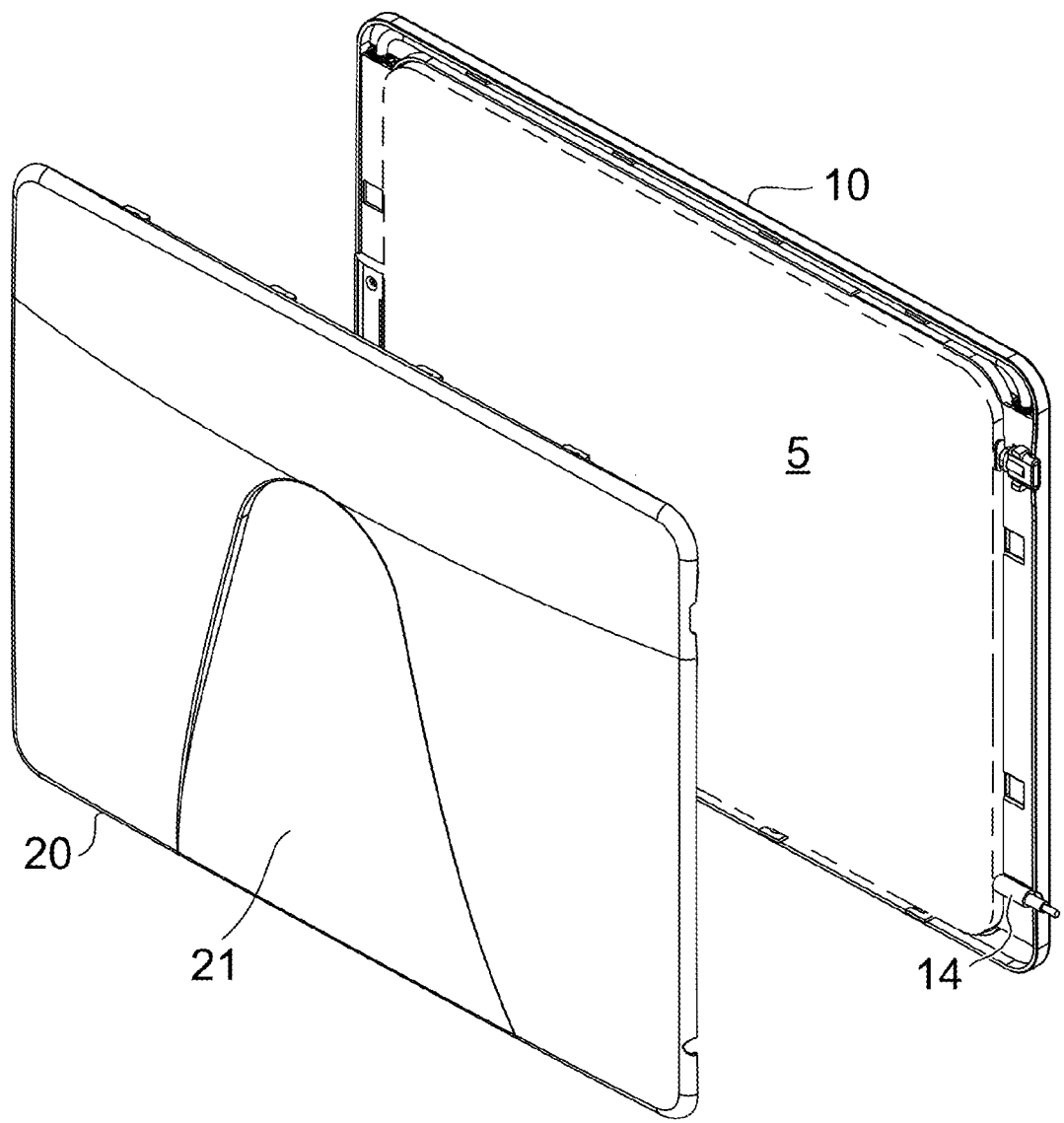
FIG. 3 is an illustrative perspective rear view of the portable touch screen device and the front and rear portions of the clam shell enclosure of FIG. 1.
Figure 4:
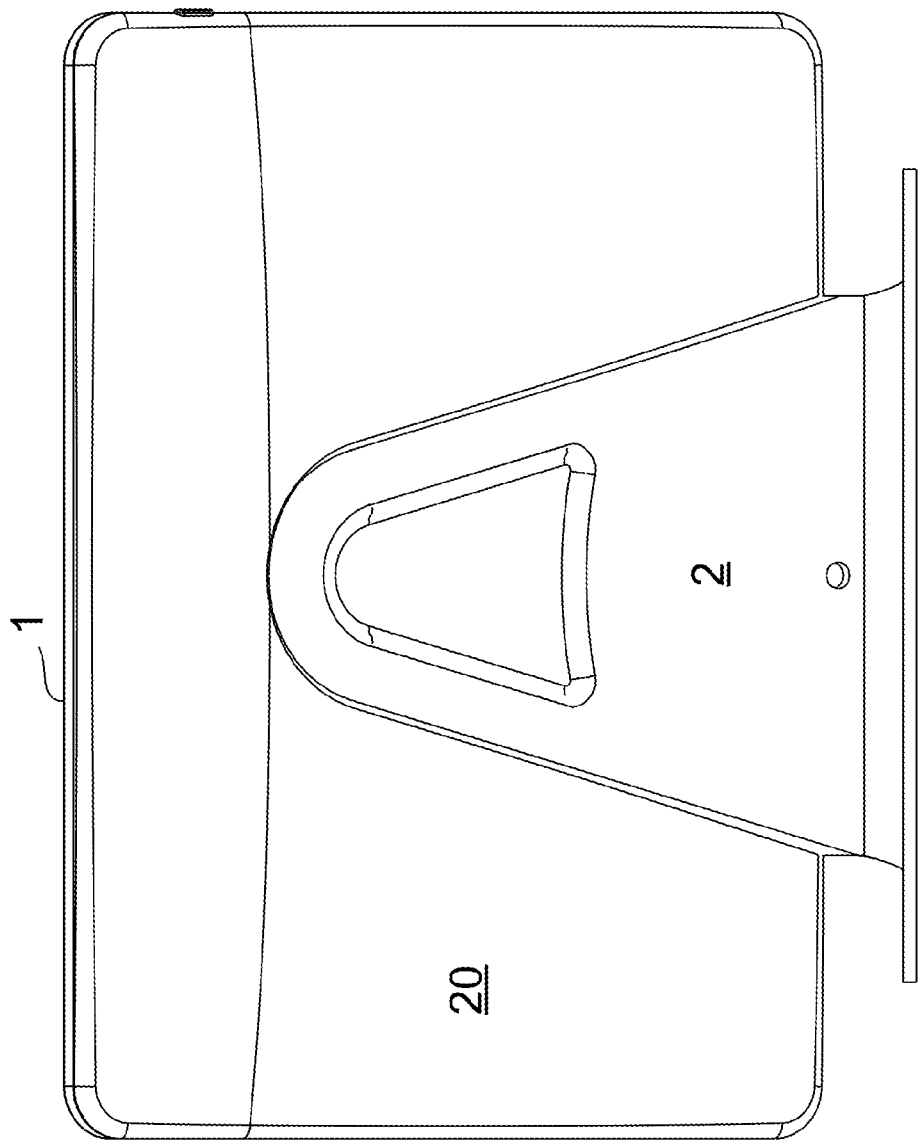
FIG. 4 is an illustrative rear view of the clam shell enclosure disposed in a docking station, according to one embodiment of the invention.

Referring to FIG. 3, an illustrative perspective rear view of the portable touch screen device 5, the front portion 10 and the rear portion 20 of the clam shell enclosure 1 are shown. The front portion 10 further includes an audio connector 14 disposed on an inside surface. The audio connector 14 is configured to electrically connect to a complementary audio port on the touch screen device 5. In some embodiments, speaker holes are disposed in an area of the enclosure 1 that is proximate to a speaker on the touch screen device 5 so that sound from the touch screen device can pass through the enclosure 1 without being muffled. The rear portion 20 includes a connector 21 that electrically mates with a docking station 2, as shown in FIG. 4. The docketing station 2 provides a means for charging rechargeable batteries disposed in the enclosure 1 and the touch screen device 5. The docking station 2 also provides a communication link with the office or home automation system or home theater (see FIG. 9), and is discussed in detail below.

The front portion 10 and the rear portion 20 engage each other along common mating edges and are held together using spring retention or pod clips (i.e., clips). The front portion 10 and the rear portion 20 are molded preferably of a high strength plastic material for both high impact strength and natural decorative effect. The clips are formed of high-strength stainless steel material for resilience and springiness. The front portion 10 and the rear portion 20 are thus tightly held together and securely hold the touch screen device 5 without the need for additional fasteners or connectors or adhesive. The enclosure 1 may be easily detached and interchanged with components of different colors and textures for aesthetic purposes, or for the servicing of components or batteries within the enclosure 1 or touch panel 5.

Referring to FIG. 4, as mentioned above, the rear portion 20 includes a connector 21 that electrically mates with the docking station 2. The docketing station 2 provides a means for charging rechargeable batteries disposed in the enclosure 1 and the touch screen device 5. The docking station 2 also provides a communication link with the office or home automation system, and is discussed in detail below. The docking station 2 further acts as a mounting stand capable of suspending the touch screen device 5 (enclosed in the enclosure 1) in space at one of a plurality of angles, which allows a user to view and operate the touch screen 5 easily.

Figure 5:
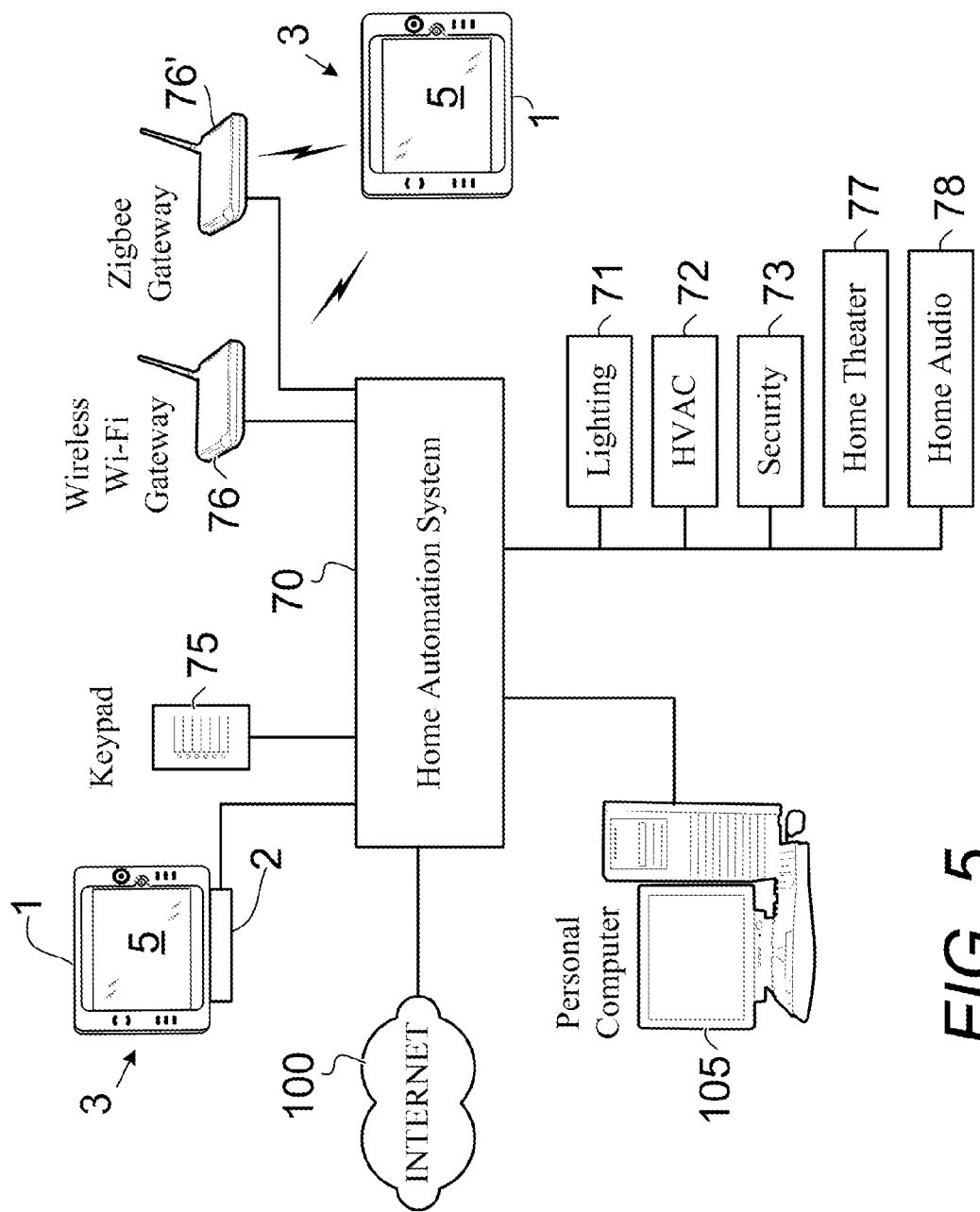
FIG. 5 is an illustrative block diagram of a plurality of remote control devices in communication with a home automation system, according to one embodiment of the invention.

Referring to FIG. 5, in one embodiment, a block diagram of a plurality of remote control devices 3 in communication with a home automation system 70 is shown. The home automation system 70 is in communication with, and controls, lighting 71, HVAC 72, security 73, a home theater system 77, and a home audio system 78. The home automation system 70 can be configured and controlled via a personal computer 105, a keypad 75, and/or, as described in detail below, the remote control device 3 via a wireless Wi-Fi gateway 76 and/or a wireless Zigbee gateway 76', or the remote control device 3 disposed in the docking station 2, which is in wired communication with the home automation system 70. In some embodiments, the remote control device 3 can be used to connect to the internet 100 via the home automation system 70 through either wired or wireless communication. In other embodiments the wireless Wi-Fi gateway 76 and the wireless Zigbee gateway 76' are combined into a single wireless gateway device.

Figure 6:
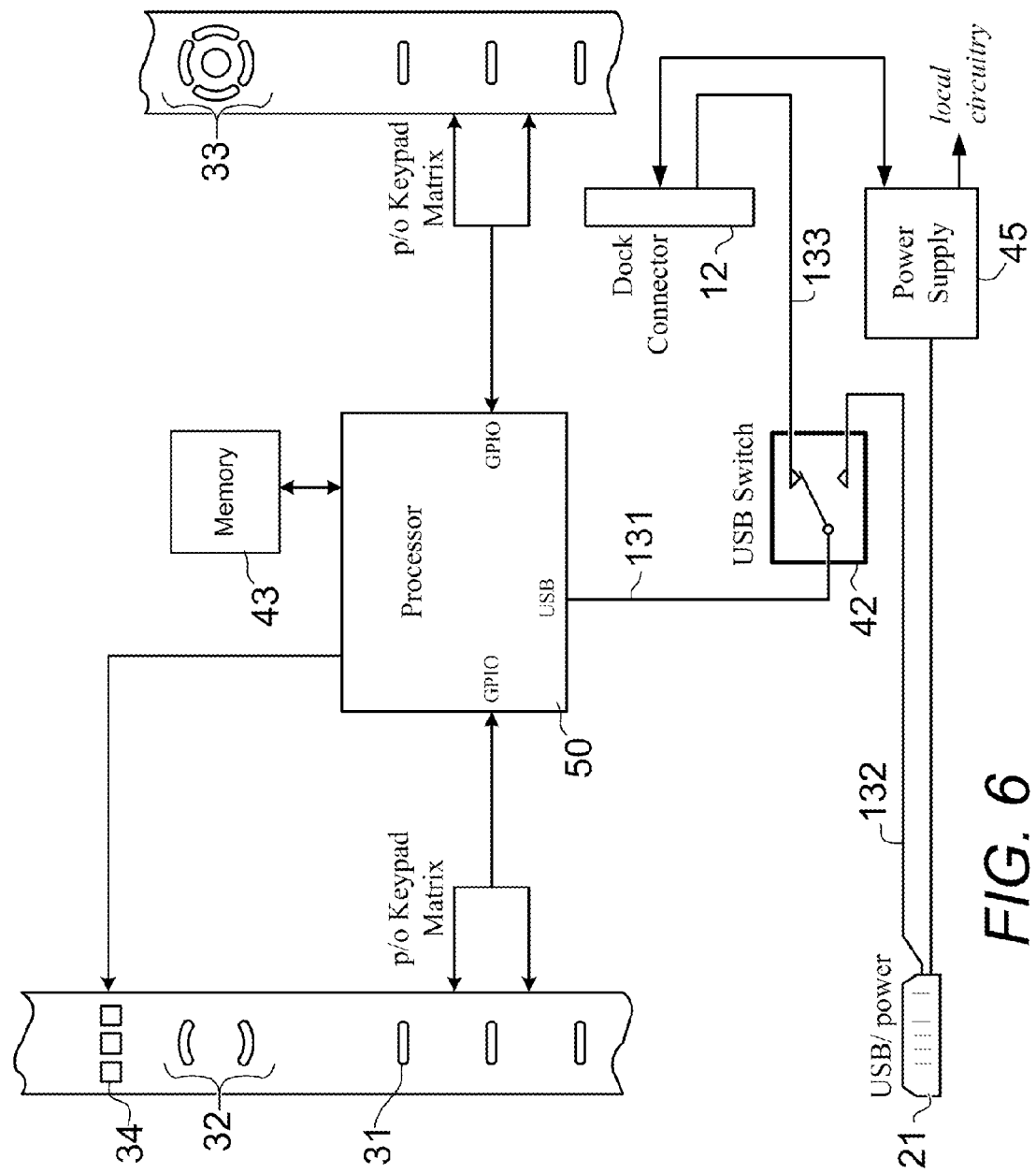
FIG. 6 is an illustrative block diagram of the electronic components disposed in the clam shell enclosure, according to one embodiment of the invention.

Referring to FIG. 6, in one embodiment, an illustrative block diagram of the electronic components disposed in the clam shell enclosure 1 is shown. The electronic components disposed in the clam shell enclosure 1 include a processor 50, a memory 43, a USB switch 42, a power supply 45, the external docking connector 21, which includes connections for USB communication and power, and the internal docking connector 12, which also includes connections for USB communication and power.

The processor 50 includes general purpose input/output (GPIO) interfaces that are in communication with one or more keypad matrices, which are in communication with the hard buttons 31, 32, 33. The processor 50 further includes a USB interface in communication with the USB switch 42 via a USB wired connection 131. The processor 50 is also in communication with the indicator lights 34 and the memory 43 (e.g., RAM, ROM, EPROM). In other embodiments, the processor 50 includes an on-board memory. The USB switch 42, which is controlled by the processor 50, is in communication with the internal docking connector 12 via a USB wired connection 133, and the external docking connector 21 via a USB wired connection 132. The external docking connector 21 is also in communication with the power supply 45. In other embodiments, the USB interface on the processor 50 is a USB on-the-go (USB-OTG) interface.

The power supply 45 includes a rechargeable battery and a charging circuit known to those skilled in the art and supplies power to all the circuitry disposed in the clam shell enclosure 1. The power supply 45 (i.e., battery) can be recharged via the external docking connector 21 when connected to the docking station 2. The power supply 45 also allows a charging current from the docking station 2 (and passing through the external docking connector 21) to pass through to the internal docking connector 12 and charge a battery disposed in the portable touch screen device 5. Further, the power supply 45 can also draw power from the battery disposed in the portable touch screen device 5 (through the internal docking connector 12) to charge the battery in the power supply 45 and supply power to the circuitry disposed in the clam shell enclosure 1.

Still referring to FIG. 6, one part or component of a software application (first application component) for controlling a home or office automation system (e.g., automation system 70) is stored in the memory 43 or in a memory on the processor 50 and executes on the processor 50. Additionally, another part or component of the software application (second application component) for controlling the automation system 70 resides and executes on the portable touch screen device 5. The first and second components of the automation system control application execute independent of any other application that may be executing on the touch screen device 5. Further, the first and second application components execute independent of each other.

The first application component executing on the processor 50 interprets input from the hard buttons 31, 32, 33, converts the hard button actuations into digital signals, and transmits the input (digital signals) to the touch screen device 5 or directly to the automation system 70, as described below. In various embodiments, at least some of the hard buttons 31, 32, 33 are dedicated control buttons with fixed functions, such as volume up/down, channel up/down, lights on/off, home, guide, info, exit, and/or mute, for example. These hard buttons execute their respective control functions upon being pressed by a user regardless of the state of the touch screen device 5. In other words, these hard buttons execute their respective control functions without the user having to navigate through control menus, or without the touch screen device 5 being involved in any way.

Other of the hard buttons 31, 32, 33, are user configurable to control various external devices (e.g., stereo, temperature, light dimmer, etc) and/or system control functions. In some embodiments, one or more of the other hard buttons are programmed to interact with a graphical user interface displayed on the touch screen device 5, or control another application executing on the touch screen device 5.

The second application component provides the optional graphical user interface displayed on the touch screen device 5, and includes soft buttons used for controlling additional components, devices, and/or functions. The second application component also receives input (digital signals from hard button actuation) from the first application component and transmits the status of the actuated hard button (e.g., pressed) and/or control instructions to the automation system or to a particular external device in communication with the automation system via a wired or wireless communication link. The second application component also returns response/status signals (via the docking connector 12) that are used to control (i.e., turn on/off) the indicator lights 34 disposed on the enclosure 1.

In one embodiment, during an initial device configuration and set-up operation, the enclosure 1 is seated in, and in communication with, the docking station 2. The processor 50 then controls the USB switch 42 to establish a communication link between the processor 50 and the external docking connector 21. In this configuration, the processor 50 communicates with an external computing device (not shown) through the docking connector 21 and the docking station 2. This external computing device initially loads the first and second application components into memory 43. Thereafter, the processor 50 controls the switch 42 to establish a communication link between the processor 50 and the internal docking connector 12. The processor 50 then installs the second application component on the touch screen device 5. In other embodiments, the second application component is installed directly onto the touch screen device 5 by means known to those skilled in the art.

In normal wireless operation/mode (i.e., the enclosure 1 is not disposed in the docking station 2), the enclosure 1 is powered by the power supply 45. Further, the processor 50 controls the USB switch 42 to establish the communication link between the processor 50 and the touch screen device 5 via the internal docking connector 12.

When a user wishes to control a function of a device that is in communication with the automation system 70, such as muting the audio of the home theater 77, for example (see FIG. 4), the user simply presses the appropriate hard button 31, 32, 33 that is dedicated to, or programmed for, muting the audio. The processor 50 executing the first application component captures and transmits the digital signal corresponding to the mute audio command created by the user pressing the mute hard button (e.g., hard button 31 or 32) to the touch screen device 5 (via the connector 12). The second application component transmits the mute audio command via a wireless communication link (e.g., wireless Wi-Fi gateway 76) to the automation system 70, which in turn transmits the mute audio command to the home theater 77.

Upon receiving the mute audio command, the home theater mutes the audio and transmits a response or status signal to the automation system 70. The automation system 70 then wirelessly transmits the response signal to the touch screen device 5 via the wireless Wi-Fi gateway 76. The second application component executing on the touch screen device 5 transmits the response/status signal to the first application component executing on the processor 50. The processor 50 uses the received response/status signal to illuminate an indicator light 34 corresponding to audio muting being activated.

In normal wired operation/mode, the enclosure 1 is disposed in the docking station 2 and powered by an external power supply. Further, the processor 50 controls the USB switch 42 to establish the communication link between the processor 50 and the external USB docking connector 21. In this configuration, the processor 50 executing the first application component bypasses the touch screen device 5 and communicates directly with the automation system 70. In other words, all commands from the enclosure 1 are transmitted directly (via the docking connector 21) to the automation system 70. Likewise, all response signals are transmitted directly to the processor 50. Consequently, the enclosure 1 is capable of controlling external devices even if the touch screen device 5 is turned off.

In diagnostic mode, the processor 50 controls the USB switch 42 to establish a communication link between the processor 50 and the external docking connector 21. In this configuration, the processor 50 communicates with an external computing device (not shown) through the docking connector 21. This external computing device emulates the operation of the second application component, which normally executes on the touch screen device 5. In this configuration the digital signals transmitted by the processor 50 can be observed and first application component can be debugged.

Figure 7:
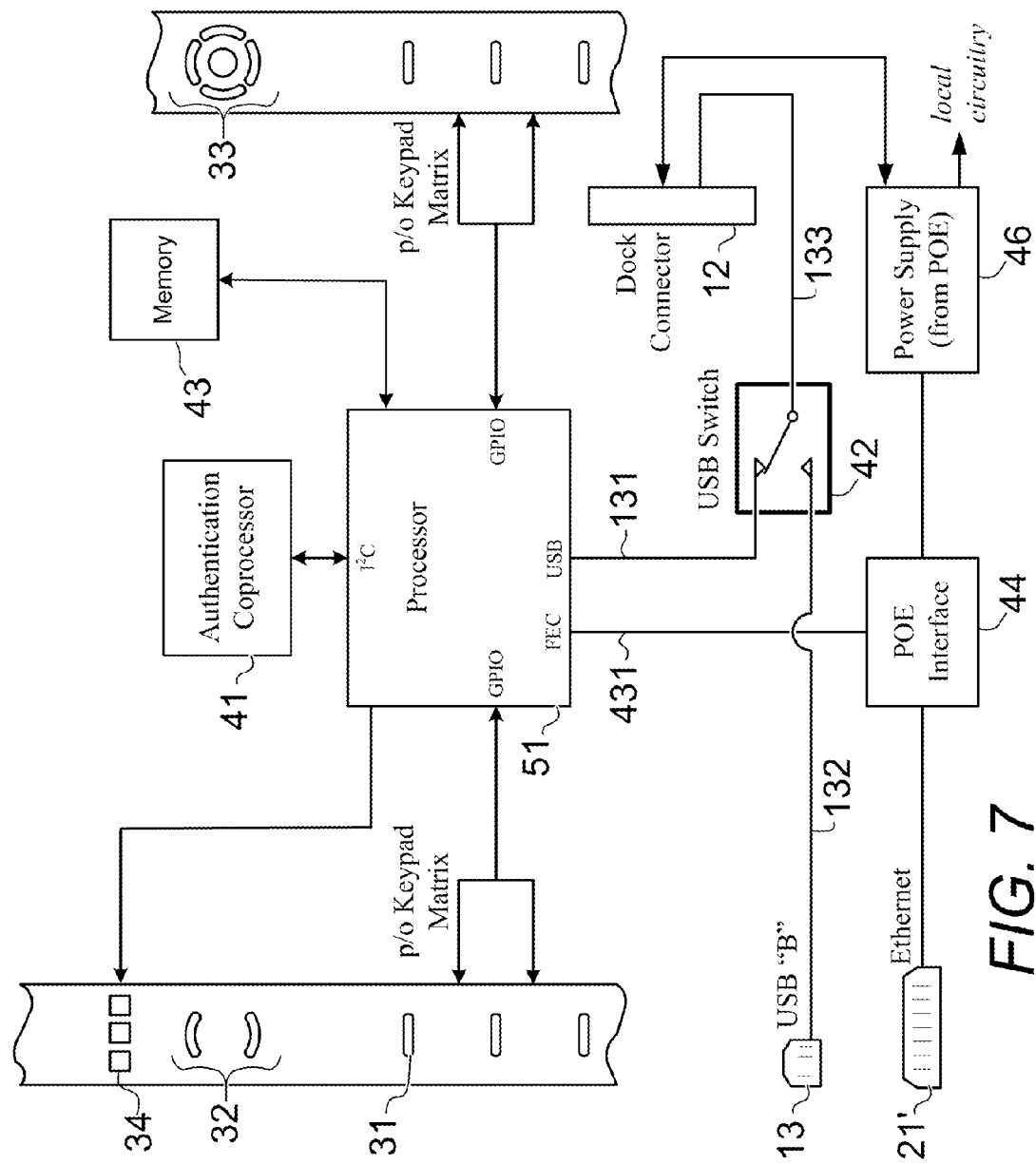
FIG. 7 is an illustrative block diagram of the electronic components disposed in the clam shell enclosure, according to another embodiment of the invention.

Referring to FIG. 7, in another embodiment, an illustrative block diagram of the electronic components disposed in the clam shell enclosure 1 is shown. The electronic components disposed in the clam shell enclosure 1 include a processor 51, an authentication coprocessor 41, the memory 43, the USB switch 42, a power supply 46, a power over Ethernet (POE) interface 44, the external USB connector 13, an external docking connector 21', which includes connections for Ethernet communication and power, and the internal docking connector 12, which includes connections for USB communication and power.

The processor 51 includes general purpose input/output (GPIO) interfaces that are in communication with one or more keypad matrices, which are in communication with the hard buttons 31, 32, 33. The processor 51 further includes a USB interface in communication with the USB switch 42 via a USB wired connection 131. The processor 51 further includes an inter-integrated circuit ($I^2C$) (i.e., a digital bus) in communication with the authentication coprocessor 41 described below. In other embodiments, the USB interface on the processor 51 is a USB on-the-go (USB-OTG) interface.

The processor 51 still further includes a fast Ethernet channel (FEC) in communication over the FEC wired connection 431 with the POE interface 44, which is in communication with the power supply 46 and the external docking connector 21'. When the external docking connector 21' is connected to the docking station 2, the POE interface 44 allows the processor 51 to communicate with an external device over an Ethernet connection.

The processor 51 is also in communication with the indicator lights 34 and the memory 43 (e.g., RAM, ROM, EPROM). In other embodiments, the processor 51 includes an on-board memory. The USB switch 42 is in communication with the internal docking connector 12 via a USB wired connection 133, and the USB connector 13 via a USB wired connection 132.

The power supply 46 includes a rechargeable battery and a charging circuit known to those skilled in the art and supplies power to all the circuitry disposed in the clam shell enclosure 1. When the enclosure 1 is disposed in the docking station 2, the POE interface 44 allows current from the Ethernet connection to pass to the power supply 46 and charge the battery therein. The POE interface 44 also allows current from the Ethernet connection to pass to the touch screen device 5 (via the internal docking connector 12) to charge a battery disposed therein. Further, the power supply 46 can also draw power from the battery disposed in the portable touch screen device 5 (through the internal docking connector 12) to charge the battery in the power supply 46 and supply power to the circuitry disposed in the clam shell enclosure 1.

The external USB connector 13 functions as a diagnostic port. When the second application component residing and executing on the touch screen device 5 needs to be installed, updated, or debugged, an external diagnostic computer is connected to the external USB connector 13, and the processor 51 switches the USB switch 42 to establish a connection between the external diagnostic computer and the touch screen device 5 (through the internal docking connector 12). The external diagnostic computer can then install or update the second application component. The external diagnostic computer can also emulate the signals produced by the hard buttons 31, 32, 33 and the first application component executing on the processor 52 in the enclosure 1, and transmit these signals to the touch screen device 5, and receive responses from the touch screen device 5. In this way, the second application component can be debugged.

The authentication coprocessor 41 is an encryption chip licensed from Apple, Inc., that is included in devices that are officially licensed to communicate with Apple® products. Consequently, if the portable touch screen device 5 were an Apple® iPad™ or Apple® iPod™, then the enclosure 1 would need an authentication coprocessor 41 to function correctly with the iPad. In operation, after the portable touch screen device 5 (i.e., iPad) and the clam shell enclosure 1 were connected together (via the internal docking connector 12), the portable touch screen device 5 would interrogate the clam shell enclosure 1 to verify (by communicating with the authentication coprocessor 41) that the enclosure 1 was a product officially licensed to communicate with the portable touch screen device 5. In this embodiment, the external USB connector 13 functions as a sync port through which the iPad or iPod can sync with Apple@ iTunes™.

In one embodiment, during an initial device configuration and set-up operation, the enclosure 1 is seated in, and in communication with, the docking station 2. In this configuration, the processor 51 communicates with an external computing device (not shown) through the docking connector 21' and the docking station 2. This external computing device initially loads the first and second application components into memory 43. Thereafter, the processor 51 controls the switch 42 to establish a communication link between the processor 51 and the internal docking connector 12. The processor 51 then installs the second application component on the touch screen device 5.

In another embodiment, the processor 51 can control the USB switch 42 to establish a communication link between the internal docking connector 12 and the external USB connector 13. In this configuration, the touch screen device 5 communicates with an external computing device (not shown). This external computing device installs the second application component onto the touch screen device 5. In still another embodiment, the second application component is installed directly onto the touch screen device 5 by means known to those skilled in the art.

In normal wireless operation/mode (i.e., the enclosure 1 is not disposed in the docking station 2), the enclosure 1 is powered by the power supply 46. Further, the processor 51 controls the USB switch 42 to establish the communication link between the processor 51 and the touch screen device 5 via the internal docking connector 12.

When a user wishes to control a function of a device that is in communication with the automation system 70, such as muting the audio of the home theater 77, for example (see FIG. 4), the user simply presses the appropriate hard button 31, 32, 33 that is dedicated to, or programmed for, muting the audio. The processor 51 executing the first application component captures and transmits the digital signal corresponding to the mute audio command created by the user pressing the mute hard button (e.g., hard button 31 or 32) to the touch screen device 5 (via the connector 12). The second application component transmits the mute audio command via a wireless communication link (e.g., wireless Wi-Fi gateway 76) to the automation system 70, which in turn transmits the mute audio command to the home theater 77.

Upon receiving the mute audio command, the home theater mutes the audio and transmits a response or status signal to the automation system 70. The automation system 70 then wirelessly transmits the response signal to the touch screen device 5 via the wireless Wi-Fi gateway 76. The second application component executing on the touch screen device 5 transmits the response signal to the first application component executing on the processor 51. The processor 51 uses the received response signal to illuminate an indicator light 34 corresponding to audio muting being activated.

In normal wired operation/mode, the enclosure 1 is disposed in the docking station 2 and powered by an external power supply. In this configuration, the processor 51 executing the first application component bypasses the touch screen device 5 and communicates directly with the automation system 70 via the Ethernet connection on the external docking connector 21'. In other words, all commands from the enclosure 1 are transmitted directly (via the docking connector 21') to the automation system 70. Likewise, all response signals are transmitted directly to the processor 51. In this configuration, since controlling the external device does not involve using the touch screen device 5, the enclosure 1 can control the external device even if the touch screen device 5 is turned off.

Alternatively, the processor 51 can control the USB switch 42 to establish the communication link between the processor 51 and the external docking connector 21'. In this configuration, the processor 51 and the touch screen device 5 function as described above with respect to normal wireless mode.

Figure 8:
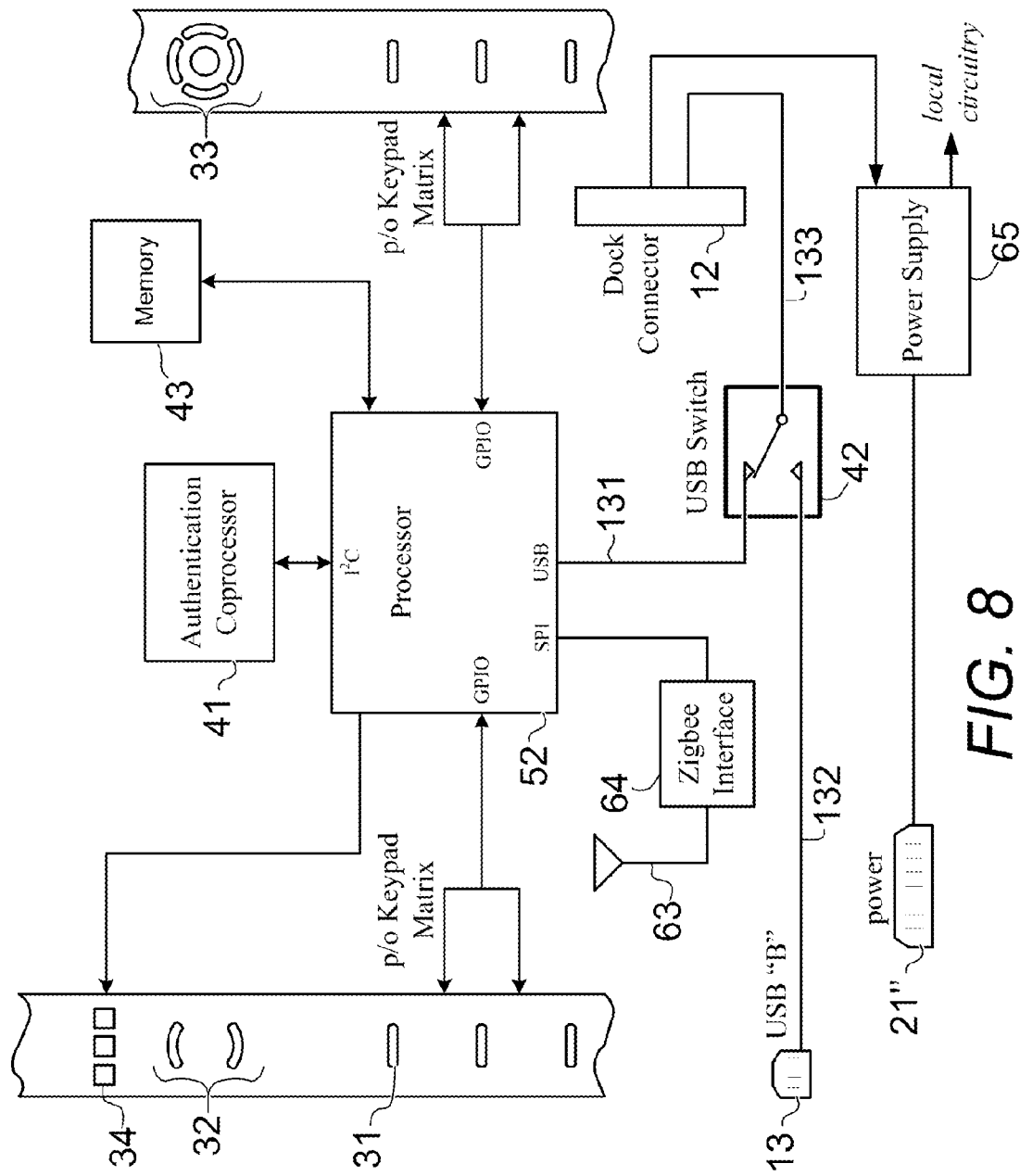
FIG. 8 is an illustrative block diagram of the electronic components disposed in the clam shell enclosure, according to still another embodiment of the invention.

Referring to FIG. 8, in still another embodiment, an illustrative block diagram of the electronic components disposed in the clam shell enclosure 1 is shown. The electronic components disposed in the clam shell enclosure 1 include a processor 52, the authentication coprocessor 41, the memory 43, the USB switch 42, a power supply 65, a Zigbee interface 64 in communication with a Zigbee antenna 63, the USB connector 13, the internal docking connector 12, which also includes connections for USB communication and power, and an external docking connector 21", which includes connections for power.

The processor 52 includes general purpose input/output (GPIO) interfaces that are in communication with one or more keypad matrices, which are in communication with the hard buttons 31, 32, 33. The processor 52 further includes a USB interface in communication with the USB switch 42 via a USB wired connection 131. The processor 52 further includes an inter-integrated circuit ($I^2C$) (i.e., a digital bus) in communication with the authentication coprocessor 41. The processor 52 still further includes a serial peripheral interface (SPI) in communication with the Zigbee interface 64. In other embodiments, the USB interface on the processor 52 is a USB on-the-go (USB-OTG) interface.

The processor 52 is also in communication with the indicator lights 34 and the memory 43 (e.g., RAM, ROM, EPROM). In other embodiments, the processor 52 includes an on-board memory. The USB switch 42 is in communication with the internal docking connector 12 via a USB wired connection 133, and the USB connector 13 via a USB wired connection 132. The authentication coprocessor 41 and the external USB connector 13 both function as previously described above with respect to the embodiment shown in FIG. 7.

The power supply 65 includes a rechargeable battery and a charging circuit known to those skilled in the art and supplies power to all the circuitry disposed in the clam shell enclosure 1. When the enclosure 1 is disposed in the docking station 2, current passes to the power supply 65 (via connector 21") and charges the battery therein. Current also passes to the touch screen device 5 (via the internal docking connector 12) to charge a battery disposed therein. The power supply 65 can also draw power from a battery disposed in portable touch screen device 5 (through the internal docking connector 12) in order to recharge the battery (in power supply 65) and supply power to the circuitry disposed in the clam shell enclosure 1.

In the embodiment shown in FIG. 8, a wired connection to the automation system 70 is not envisioned. Therefore, during the initial device configuration and set-up operation, an external computing device (not shown) wirelessly communicates (via the Zigbee gateway 76') with the processor 52 (via the Zigbee interface 64) to load the first and second application components into memory 43. Thereafter, the processor 52 controls the USB switch 42 to establish a communication link between the processor 52 and the internal docking connector 12. The processor 52 then installs the second application component on the touch screen device 5.

In another embodiment, the processor 52 can control the USB switch 42 to establish a communication link between the internal docking connector 12 and the external USB connector 13. In this configuration, the touch screen device 5 communicates with an external computing device (not shown). This external computing device installs the second application component onto the touch screen device 5. In still another embodiment, the second application component is installed directly onto the touch screen device 5 by means known to those skilled in the art.

In normal wireless operation/mode (i.e., the enclosure 1 is not disposed in the docking station 2), the enclosure 1 is powered by the power supply 65. Further, the processor 52 controls the USB switch 42 to establish the communication link between the processor 52 and the touch screen device 5 via the internal docking connector 12.

When a user wishes to control a function of a device that is in communication with the automation system 70, such as muting the audio of the home theater 77, for example (see FIG. 4), the user simply presses the appropriate hard button 31, 32, 33 that is dedicated to, or programmed for, muting the audio.

In one embodiment, the processor 52 executing the first application component captures and transmits the digital signal corresponding to the mute audio command created by the user pressing the mute hard button (e.g., hard button 31 or 32) to the touch screen device 5 (via the connector 12). The second application component transmits the mute audio command via a wireless communication link (e.g., wireless Wi-Fi gateway 76) to the automation system 70, which in turn transmits the mute audio command to the home theater 77. Upon receiving the mute audio command, the home theater mutes the audio and transmits a response or status signal to the automation system 70. The automation system 70 then wirelessly transmits the response signal to the touch screen device 5 via the wireless Wi-Fi gateway 76. The second application component executing on the touch screen device 5 transmits the response signal to the first application component executing on the processor 52. The processor 52 uses the received response signal to illuminate an indicator light 34 corresponding to audio muting being activated.

In another embodiment, the processor 52 executing the first application component captures and transmits the digital signal corresponding to the mute audio command directly to the automation system 70 via the Zigbee interface 64 and the wireless Zigbee gateway 76'. The automation system 70 then transmits the mute audio command to the home theater 77. Upon receiving the mute audio command, the home theater mutes the audio and transmits a response or status signal to the automation system 70. The automation system 70 then wirelessly transmits the response signal to the touch screen device 5 via the wireless Zigbee gateway 76'. The second application component executing on the touch screen device 5 transmits the response signal to the first application component executing on the processor 52. The processor 52 uses the received response signal to illuminate an indicator light 34 corresponding to audio muting being activated.

In still another embodiment, the processor 52 executing the first application component captures and transmits the digital signal corresponding to the mute audio command directly to the automation system 70 via the Zigbee interface 64 and the wireless Zigbee gateway 76'. The automation system 70 then transmits the mute audio command to the home theater 77. Upon receiving the mute audio command, the home theater mutes the audio and transmits a response or status signal to the automation system 70. The automation system 70 then wirelessly transmits the response signal directly to the processor 52 via the wireless Zigbee gateway 76' and the Zigbee interface 64. The processor 52 uses the received response signal to illuminate an indicator light 34 corresponding to audio muting being activated. In this configuration, since controlling the external device does not involve using the touch screen device 5, the enclosure 1 can control the external device even if the touch screen device 5 is turned off.

Figure 9:
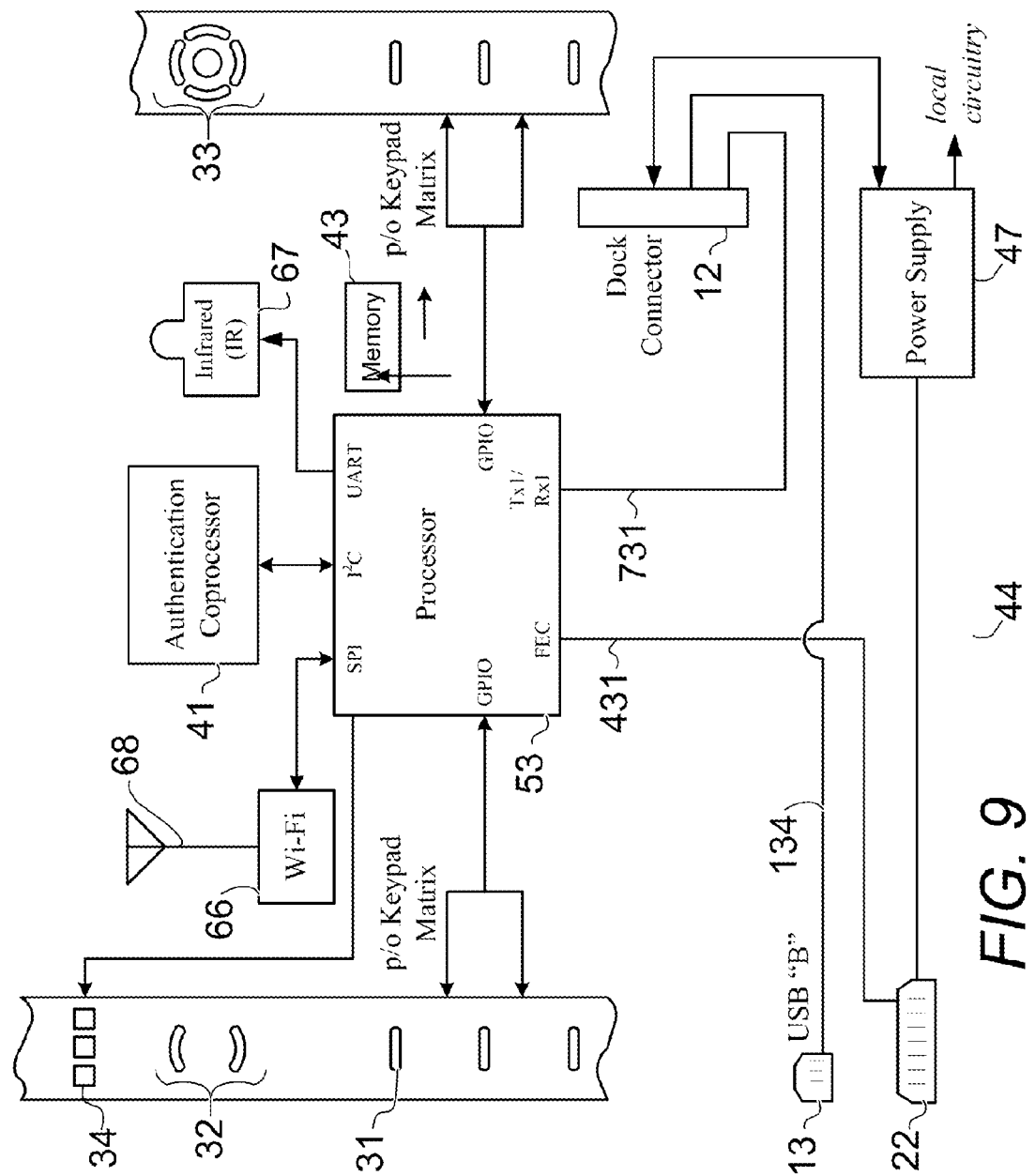
FIG. 9 is an illustrative block diagram of the electronic components disposed in the clam shell enclosure, according to yet another embodiment of the invention.

Referring to FIG. 9, in yet another embodiment, an illustrative block diagram of the electronic components disposed in the clam shell enclosure 1 is shown. The electronic components disposed in the clam shell enclosure 1 include a processor 53, an authentication coprocessor 41, the memory 43, a power supply 47, the USB connector 13, a Wi-Fi interface 66 in communication with a Wi-Fi antenna 68, an infrared (IR) interface 67, the external docking connector 22, which includes connections for Ethernet communication and power, and the internal docking connector 12, which also includes connections for USB communication and power.

The processor 53 includes general purpose input/output (GPIO) interfaces that are in communication with one or more keypad matrices, which are in communication with the hard buttons 31, 32, 33. The processor 53 further includes an inter-integrated circuit (I$^2$C) (i.e., a digital bus) in communication with the authentication coprocessor 41. The processor 53 further includes a serial peripheral interface (SPI) in communication with the Wi-Fi interface 66 in communication with a Wi-Fi antenna 68.

The processor further includes a universal asynchronous receiver/transmitter (UART) in communication with the IR interface 67. The infrared (IR) interface 67 is in communication with the IR emitter 17 (shown in FIG. 1). In various embodiments, the IR interface 67 includes one of IrDA, RC-5, and a proprietary infrared protocol.

The processor 53 still further includes a transmit/receive (TX1/RX1) interface in communication with the touch screen device 5 over a wired digital interface 731 through the internal docking connector 12. In various embodiments, the wired digital interface 731 is one of a CAN bus, Ethernet, IEEE-1394 (Firewire), RS-232, RS-422, RS-485, and USB.

The processor 53 still further includes a fast Ethernet channel (FEC) in communication over the FEC wired connection 431 with the external docking connector 22.

The processor 53 is in communication with the indicator lights 34 and the memory 43 (e.g., RAM, ROM, EPROM). In other embodiments, the processor 53 includes an on-board memory. The USB connector 13 is in communication with the touch screen device 5 via a fourth USB wired connection 134 to the internal docking connector 12. The authentication coprocessor 41 and the external USB connector 13 both function as previously described above with respect to FIG. 7.

The power supply 47 includes a rechargeable battery and a charging circuit known to those skilled in the art and supplies power to all the circuitry disposed in the clam shell enclosure 1. The power supply 47 can be recharged via the external docking connector 22 when connected to the docking station 2. The power supply 47 also allows a charging current from the docking station 2 (through the external docking connector 22) to pass through to the internal docking connector 12 and charge a battery disposed in the portable touch screen device 5. Further, the power supply 47 can draw power from the battery disposed in portable touch screen device 5 (through the internal docking connector 12) in order to supply power to the circuitry disposed in the clam shell enclosure 1.

In one embodiment, during an initial device configuration and set-up operation, the enclosure 1 is seated in, and in communication with, the docking station 2. In this configuration, the processor 53 communicates with an external computing device (not shown) through the docking connector 22 and the docking station 2. This external computing device initially loads the first and second application components into memory 43. Thereafter, the processor 53 then installs the second application component on the touch screen device 5 over the wired digital interface 731 via the docking connector 12

In another embodiment, during the initial device configuration and set-up operation, the external computing device (not shown) wirelessly communicates with the processor 53 via the Wi-Fi interface 66 to load the first and second application components into memory 43. Thereafter, the processor 53 then installs the second application component on the touch screen device 5 over the wired digital interface 731 via the docking connector 12.

In still another embodiment, the touch screen device 5 communicates with the external computing device (not shown) via the external USB connector 13 and the docking connector 12. The external computing device installs the second application component onto the touch screen device 5. In yet another embodiment, the second application component is installed directly onto the touch screen device 5 by means known to those skilled in the art.

In operation, when a user wishes to control a function of a device that is in communication with the automation system 70, such as muting the audio of the home theater 77, for example (see FIG. 4), the user simply presses the appropriate hard button 31, 32, 33 that is dedicated to, or programmed for, muting the audio.

In one embodiment, in normal wireless operation/mode, the processor 53 executing the first application component captures and transmits the digital signal corresponding to the mute audio command created by the user pressing the mute hard button (e.g., hard button 31 or 32) to the second application component executing on the touch screen device 5 (via the wired digital interface and the connector 12). The second application component transmits the mute audio command via a wireless communication link (e.g., wireless Wi-Fi gateway 76) to the automation system 70, which in turn transmits the mute audio command to the home theater 77. Upon receiving the mute audio command, the home theater mutes the audio and transmits a response or status signal to the automation system 70. The automation system 70 then wirelessly transmits the response signal to the touch screen device 5 via the wireless Wi-Fi gateway 76. The second application component executing on the touch screen device 5 transmits the response signal to the first application component executing on the processor 53. The processor 53 uses the received response signal to illuminate an indicator light 34 corresponding to audio muting being activated.

In another embodiment, the processor 53 executing the first application component captures and transmits the digital signal corresponding to the mute audio command directly to the automation system 70 via the Wi-Fi interface 66 and the wireless Wi-Fi gateway 76. The automation system 70 then transmits the mute audio command to the home theater 77. Upon receiving the mute audio command, the home theater mutes the audio and transmits a response or status signal to the automation system 70. The automation system 70 then wirelessly transmits the response signal to the touch screen device 5 via the wireless Wi-Fi gateway 76. The second application component executing on the touch screen device 5 transmits the response signal to the first application component executing on the processor 53. The processor 53 uses the received response signal to illuminate an indicator light 34 corresponding to audio muting being activated.

In still another embodiment, the processor 53 executing the first application component captures and transmits the digital signal corresponding to the mute audio command directly to the automation system 70 via the Wi-Fi interface 66 and the wireless Wi-Fi gateway 76. The automation system 70 then transmits the mute audio command to the home theater 77. Upon receiving the mute audio command, the home theater 77 mutes the audio and transmits a response or status signal to the automation system 70. The automation system 70 then wirelessly transmits the response signal directly to the processor 53 via the wireless Wi-Fi gateway 76 and the Wi-Fi interface 66. The processor 53 uses the received response signal to illuminate an indicator light 34 corresponding to audio muting being activated. In this configuration, since controlling the external device does not involve using the touch screen device 5, the enclosure 1 can control the external device even if the touch screen device 5 is turned off.

In yet another embodiment, in normal wired operation/mode, the enclosure 1 is disposed in the docking station 2 and powered by an external power supply. In this configuration, the processor 53 executing the first application component bypasses the touch screen device 5 and communicates directly with the automation system 70 via the Ethernet connection on the external docking connector 22. In other words, all commands from the enclosure 1 are transmitted directly (via the docking connector 22) to the automation system 70. Likewise, all response signals are transmitted directly to the processor 53. In this configuration, since controlling the external device does not involve using the touch screen device 5, the enclosure 1 can control the external device even if the touch screen device 5 is turned off.

Alternatively, the processor 53 and the touch screen device 5 can communicate control and response signals back and forth as described above with respect to normal wireless mode.

In still another embodiment, the processor 53 transmits control signals to the automation system 70 or directly to the individual devices (e.g., television, DVD player, etc) via the IR interface 67 and IR emitter 17. In this embodiment, response or status signals are received by the processor 53 from the controlled devices by the various means described above.

As mentioned above, in various embodiments, the enclosure 1 includes one of IEEE-802.11 (Wi-Fi) and IEEE-802.15.4 (Zigbee) wireless digital interfaces in communication with the processor 52, 53. In other embodiments, the wireless digital interface in communication with the processor includes one of IEEE-802.15.1 (Bluetooth), infiNET™, and a proprietary protocol in the ultra high frequency band.

In still other embodiments, the wireless digital interface and/or the infrared interface 67 provides a communication link between the processor in the enclosure 1 and the touch screen device 5.

In yet another embodiment, when the enclosure 1 is seated in, and mated with, the docking station 2, the docking station 2 is configured for transmitting streaming media received from an external device to the touch screen device 5.

In still another embodiment, when the enclosure 1 is seated in, and mated with, the docking station 2, the docking station 2 transmits control signals received from the processor 50, 51, 52, 53 to an external device as Cresnet® control signals.

Figure 10:
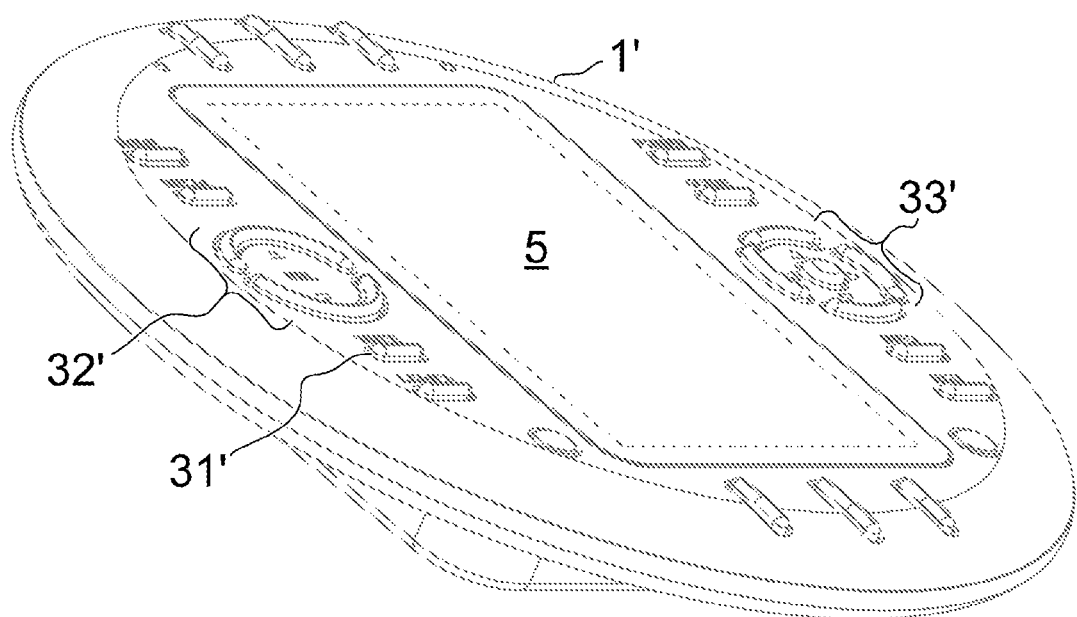
FIG. 10 is an illustrative perspective front view of a portable touch screen device encased within a circular clam shell enclosure that includes dedicated hard buttons, according to another embodiment of the invention.

Referring to FIG. 10, in another embodiment, the portable touch screen device 5 is encased within a circular enclosure 1' that includes dedicated hard buttons 31', 32', 33'. In this embodiment, the portable touch screen device 5 is envisioned to be a smart phone with a touch screen.

LIST OF ACRONYMS USED IN THE DETAILED DESCRIPTION OF THE INVENTION

The following is a list of the acronyms used in the specification in alphabetical order.
A amperes
AV audio visual
CAN controller area network (data transfer protocol)
CPU central processing unit
DVD digital video disc
EPROM electronically programmable read only memory
FEC fast Ethernet channel
GPIO general purpose input/output
HVAC heating, ventilation, and air conditioning
I²C inter-integrated circuit (digital bus)
IEEE Institute of Electrical and Electronics Engineers
IR infrared
IrDA Infrared Data Association (data protocol)
OFN optical finger navigation
PC personal computer
POE power over Ethernet
RAM random access memory
ROM read only memory
RSI repetitive strain injury
RF4CE Radio Frequency for Consumer Electronics
RX receiver
SEL select
SPI serial peripheral interface
TTL transistor-transistor logic (data transmission voltage level)
TX transmitter
UART universal asynchronous receiver/transmitter
UHF ultra-high frequency
USB Universal Serial Bus
USB-OTG USB on-the-go
V volt
VDC volts, direct current

ALTERNATE EMBODIMENTS

Alternate embodiments may be devised without departing from the spirit or the scope of the invention. For example, in alternative embodiments the first control button and the second control button may be joysticks.

INDUSTRIAL APPLICABILITY

To solve the aforementioned problems, the present invention is a unique portable smart touch screen device disposed in, and in communication with, a clam shell enclosure that includes one or more dedicated hard buttons, processing, and communications.

What is claimed is:

1. A control system for a portable touch screen device having integral processing capability, the control system comprising:
   (a) an enclosure comprising a front clam shell portion and a rear clam shell portion, the enclosure being configured for encasing the portable touch screen device, the front claim shell portion defining an opening through which the touch screen of the portable touch screen device may be viewed and accessed while the enclosure encases the portable touch screen device;
   (b) an internal docking connector disposed inside the enclosure and configured for communicatively mating with the portable touch screen device;
   (c) a plurality of hard buttons disposed on the enclosure, wherein at least one of the hard buttons is functionally configured for use with an application program running on the portable touch screen device;
   (d) a processor disposed inside the enclosure and configured for converting button actuations into a digital format; and
   (e) a first facility disposed inside the enclosure for communicating the digital format to the portable touch screen device via the internal docking connector, wherein the application program is configured such that, during operation, the application program communicates a status of the at least one hard button to at least one external device.

2. The control system of claim 1, further comprising an external USB connector.

3. The control system of claim 2, further comprising:
   (a) a USB switch;
   (b) a first USB wired connection between the processor and the USB switch;
   (c) a second USB wired connection between the internal docking connector and the USB switch; and
   (d) a third USB wired connection between the USB switch and the external USB connector.

4. The control system of claim 1, further comprising an audio connector which mates directly to the portable touch screen device.

5. The control system of claim 1, further comprising an authentication coprocessor.

6. The control system of claim 1, wherein the application program is configured for controlling home and office equipment, the application program providing a user with status indications related to the home and office equipment, and hard button actuations are communicated wirelessly from the portable touch screen device in order to control the home and office equipment.

7. The control system of claim 6, wherein the hard buttons are operable to adjust audio volume and lighting brightness without navigating through subpages of the application program.

8. The control system of claim 1, wherein the enclosure further comprises a wireless digital interface.

9. The control system of claim 8, wherein the wireless digital interface is selected from the group consisting of: IEEE-802.11 (Wi-Fi), IEEE-802.15.1 (Bluetooth), IEEE-802.15.4 (Zigbee), and infiNET.

10. The control system of claim 8, wherein the wireless digital interface comprises a proprietary protocol in the UHF frequency band.

11. The control system of claim 8, wherein the wireless digital interface functions as a communication channel between the processor and the portable touch screen device.

12. The control system of claim 8, wherein the wireless digital interface functions as a communication channel between the processor and an external device.

13. The control system according to claim 1, wherein the hard buttons further comprise:
    (a) OSD navigation pad;
    (b) volume up/down; and
    (c) dedicated function buttons to control "mute", "lights", "home", "guide", "info", and "exit".

14. The control system of claim 1, wherein the enclosure further comprises an external docking connector configured for communicatively mating with a mounting stand.

15. The control system of claim 14, wherein the mounting stand is configured for supporting the enclosure in space, is connected to an external power source, and is further configured for providing electrical power to the portable touch screen device.

16. A control system for a portable touch screen device having integral processing capability, the control system comprising:
    (a) an enclosure comprising a front clam shell portion and a rear clam shell portion, the enclosure being configured for encasing the portable touch screen device, the front claim shell portion defining an opening through which the touch screen of the portable touch screen device may be viewed and accessed while the enclosure encases the portable touch screen device;
    (b) a plurality of hard buttons disposed on the enclosure, wherein at least one of the hard buttons is functionally configured for controlling home or office equipment; and
    (c) a wireless digital interface disposed inside the enclosure.

17. A control system for a portable touch screen device, the control system comprising:
    (a) an enclosure comprising a front clam shell portion and a rear clam shell portion, the enclosure being configured for encasing the portable touch screen device, the front claim shell portion defining an opening through which the touch screen of the portable touch screen device may be viewed and accessed while the enclosure encases the portable touch screen device;
    (b) one or more hard buttons disposed on the enclosure; and
    (c) a communication path disposed inside the enclosure between the control system and the portable touch screen device, the communication path configured for communicating control information.

18. The control system of claim 17, wherein the communication path communicates signals corresponding to actuations of the hard buttons to the portable touch screen device.

19. The control system of claim 17, wherein the control information comprises control commands to be transmitted by the portable touch screen device to an external component.

20. The control system of claim 17, wherein the communication path communicates status information corresponding to an external device from the portable touch screen device to the control system.

21. The control system of claim 17, wherein the communication path further comprises an internal docking connector configured for mating with the portable touch screen device and a wired digital interface selected from the group consisting of CAN bus, Ethernet, IEEE-1394 (Firewire), RS-232, RS-422, RS-485, and USB.

22. The control system of claim 17, wherein the communication path communicates control information from the portable touch screen device to the control system, and the control system is further configured for transmitting the control information to an external device.

23. The control system of claim 17, wherein the communication path communicates status information corresponding to an external device from the control system to the portable touch screen device.

24. The control system of claim 17, further comprising a wireless digital interface selected from the group consisting of: IEEE-802.11 (Wi-Fi), IEEE-802.15.1 (Bluetooth), IEEE-802.15.4 (Zigbee), infiNET, and a proprietary protocol in the UHF band.

25. The control system of claim 17, further comprising a wireless digital interface that functions as a communication channel between the control system and an external device.

26. The control system of claim 17, further comprising a wireless digital interface that functions as a communication channel between the control system and the portable touch screen device.

27. The control system of claim 17, wherein at least one of the buttons is configured to remain functional regardless of the operational status of the portable touch screen device.

28. The control system of claim 17, wherein at least one of the hard buttons is configured for use with an application program running on the portable touch screen device, and at least one other hard button is configured to remain functional independent of the operational status of the application program.

29. The control system of claim 17, further comprising a mounting stand for supporting the enclosure.

30. The control system of claim 29, wherein the mounting stand further comprises an Ethernet interface.

31. The control system of claim 29, wherein the mounting stand further comprises a power-over-Ethernet interface, and a detachable wired connection between the mounting stand and the enclosure.

32. The control system of claim 17, wherein the enclosure comprises a front cover sizably adapted to protectively fit together along mating edges around the portable touch screen device, and the front cover includes an access opening providing viewing access to a display screen of the portable touch screen device.

33. The control system of claim 17, further comprising a battery, and a charging circuit, wherein the battery and charging circuit are configured to supply supplemental power to the portable touch screen device.

* * * * *